United States Patent
Kuss (10) Patent No.: US 12,190,536 B2
(45) Date of Patent: Jan. 7, 2025

(54) DEVICE AND METHOD FOR TRAINING A NEURAL NETWORK FOR CONTROLLING A ROBOT

(71) Applicant: Robert Bosch GmbH, Stuttgart (DE)

(72) Inventor: Alexander Kuss, Schoenaich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 481 days.

(21) Appl. No.: 17/698,703

(22) Filed: Mar. 18, 2022

(65) Prior Publication Data
US 2022/0301209 A1   Sep. 22, 2022

(30) Foreign Application Priority Data

Mar. 22, 2021   (DE) ...................... 10 2021 202 759.8

(51) Int. Cl.
*G06T 7/55*       (2017.01)
*G06F 18/214*     (2023.01)
*G06T 7/70*       (2017.01)

(52) U.S. Cl.
CPC ............ *G06T 7/55* (2017.01); *G06F 18/2148* (2023.01); *G06T 7/70* (2017.01)

(58) Field of Classification Search
CPC ... G06T 7/55; G06T 7/70; G06T 2207/20081; G06T 2207/20084; G06F 18/2148; G06V 2201/06; G06V 20/52; G06V 10/82; B25J 9/161
See application file for complete search history.

(56) References Cited

U.S. PATENT DOCUMENTS

2020/0082567 A1*  3/2020  Liu ..................... G06T 7/248
2020/0198130 A1*  6/2020  Goldberg ............ B25J 9/1697
2021/0312655 A1* 10/2021  Tang ................... G06N 3/08
(Continued)

FOREIGN PATENT DOCUMENTS

DE   102014102943 A1   8/2015
DE   102015111080 A1  12/2016
DE   202017106506 U1   4/2018
(Continued)

*Primary Examiner* — Brandon J Miller
(74) *Attorney, Agent, or Firm* — NORTON ROSE FULBRIGHT US LLP; Gerard A. Messina (57) ABSTRACT

A method for training a neural network for controlling a robot. The method includes ascertaining a camera pose in a robot cell and an uncertainty area around the ascertained camera pose, ascertaining an object area in the robot cell, generating training-camera-images, for each training-camera-image a training-camera-image camera pose being randomly established in the uncertainty area around the ascertained camera pose, a training-camera-image object pose being randomly established in the object area and the training-camera-image being generated, so that it shows the object with the training-camera-image object pose from the perspective of a camera with the training-camera-image camera pose, generating training data from the training-camera-images, each training-camera-image being assigned one or multiple training-robot control parameters for handling the object in the training-camera-image object pose of the training-camera-image, and training the neural network using the training data.

10 Claims, 4 Drawing Sheets

(56) References Cited

U.S. PATENT DOCUMENTS

2022/0072707 A1* 3/2022 Fan ........................... G06T 7/73

FOREIGN PATENT DOCUMENTS

| | | |
|---|---|---|
| DE | 202018103922 U1 | 8/2018 |
| DE | 102017105174 A1 | 9/2018 |
| DE | 102019002065 A1 | 10/2019 |
| DE | 102019122790 A1 | 2/2020 |
| DE | 102019121889 B3 | 11/2020 |
| DE | 102019206444 A1 | 11/2020 |
| DE | 102020114583 A1 | 1/2021 |

* cited by examiner

DEVICE AND METHOD FOR TRAINING A NEURAL NETWORK FOR CONTROLLING A ROBOT

CROSS REFERENCE

The present application claims the benefit under 35 U.S.C. § 119 of German Patent Application No. DE 10 2021 202 759.8 filed on Mar. 22, 2021, which is expressly incorporated herein by reference in its entirety.

FIELD

Various exemplary embodiments relate in general to a device and to a method for training a neural network for controlling a robot.

BACKGROUND INFORMATION

In order to enable a flexible manufacturing or processing of objects by a robot, it is desirable for the robot to be able to manipulate an object regardless of the pose with which the object is placed into the workspace of the robot. A control unit should therefore be capable of correctly generating control parameters for the robot for each pose (i.e., position and orientation) of the object, so that the robot is able, for example, to grip the object at the correct point in order, for example, to fasten it to another object or is able to manipulate the object at the correct point in some other way (welding, painting, etc.). This means that the control unit should be able to generate suitable control parameters based on sensor information reflected by the pose of the object, for example, from one or from multiple camera images that are recorded by a camera mounted on the robot or close to the robot.

SUMMARY

According to various specific embodiments of the present invention, a method is provided for training a neural network for controlling a robot, including ascertaining a camera pose in a robot cell and an uncertainty area around the ascertained camera pose, ascertaining an object area in the robot cell, which contains positions for an object to be manipulated by the robot, generating training-camera-images, for each training-camera-image a training-camera-image camera pose being randomly established in the uncertainty area around the ascertained camera pose, a training-camera-image object pose being randomly established in the object area, and the training-camera-image being generated so that it shows the object with the training-camera-image object pose from the perspective of a camera with the training-camera-image camera pose, generating training data from the training-camera-images, each training-camera-image being assigned one or multiple training-robot control parameters for handling the object in the training-camera-image object pose of the training-camera-image, and training the neural network using the training data, the neural network being trained for the purpose of outputting from a camera image that shows the object a specification of one or of multiple robot control parameters for manipulating the object.

The approach described above uses properties of the robot system as they are used in practice (in particular, the camera position), in order to generate a training data set for a robot control (for example, for gripping an object). As a result, the simulated camera images very closely approximate those images as they occur or would occur in practice (for corresponding object poses). The use of camera images for a training data set for a neural network thus makes a training of the neural network possible, so that it is able to generate precise predictions for control parameters, for example, a gripping position for a scenario, in which a robot is to pick up an object from an object area (for example, a box).

Various exemplary embodiments of the present invention are specified below.

Exemplary embodiment 1 is a method for training a neural network for controlling a robot as described above.

Exemplary embodiment 2 is the method according to exemplary embodiment 1, the uncertainty area of the ascertained camera pose including an uncertainty area for the ascertained camera position and/or an uncertainty area for the ascertained camera orientation.

Thus, uncertainties both in the positioning as well as in the orientation during the camera calibration may be taken into account. Since both uncertainties typically occur in practice, this makes it possible to generate training data for a training of the neural network, which is robust with respect to both types of uncertainties.

Exemplary embodiment 3 is the method according to exemplary embodiment 2, the training-camera-image camera pose being randomly selected according to a normal distribution corresponding to the uncertainty area for the ascertained camera position and/or according to a normal distribution corresponding to the uncertainty area for the ascertained camera orientation.

The normal distribution provides a physically realistic variation around the ascertained camera pose, as it typically results in the case of calibration errors.

Exemplary embodiment 4 is the method according to one of exemplary embodiments 1 through 3, including ascertaining an uncertainty area around the ascertained object area pose, and the establishment of the training-camera-image object pose including the random selection of a camera-image object area pose in the object-area uncertainty area and the random establishment of the training-camera-image object pose in the object area at the camera-image-selected object area pose.

In this way, uncertainties in the calibration of the object area are also taken into account.

Exemplary embodiment 5 is the method according to exemplary embodiment 4, the training-camera-image object area pose being randomly selected according to a normal distribution corresponding to the uncertainty area for the ascertained object area pose.

As in the case of the camera, the normal distribution provides a physically realistic variation around the object area pose.

Exemplary embodiment 6 is the method according to one of exemplary embodiments 1 through 5, the training-camera-image object pose being established by establishing a training-camera-image object pose according to an equal distribution of object poses in the object area.

This enables a uniform training of the neural network for all object poses that occur during operation.

Exemplary embodiment 7 is the method according one of exemplary embodiments 1 through 6, the training-camera-image object pose being established by establishing a training-camera-image object pose according to a transformation into the object area.

Within the object area, the training-camera-image object pose (position and orientation) may be selected randomly, for example, equally distributed. This enables a uniform training of the neural network for all object orientations that may occur during operation.

Exemplary embodiment 8 is the method for controlling a robot, including training a neural network according to one of exemplary embodiments 1 through 7, receiving a camera image that shows an object to be handled by the robot, feeding the camera image to the neural network and controlling the robot according to the robot control parameters specified by the output of the neural network.

Exemplary embodiment 9 is a device, which is configured to carry out the method according to one of exemplary embodiments 1 through 8.

Exemplary embodiment 10 is a computer program, including program instructions which, when they are executed by one or by multiple processors, prompt the one or multiple processors to carry out a method according to one of exemplary embodiments 1 through 8.

Exemplary embodiment 11 is a computer-readable memory medium, on which program instructions are stored which, when they are executed by one or by multiple processors, prompt the one or multiple processors to carry out a method according to one of exemplary embodiments 1 through 8.

BRIEF DESCRIPTION OF THE DRAWINGS

Exemplary embodiments of the present invention are represented in the figures and are explained in greater detail below. In the figures, identical reference numerals everywhere in the multiple views refer in general to the same parts. The figures are not necessarily true to scale, the emphasis instead being placed in general on the representation of the main features of the present invention.

DETAILED DESCRIPTION OF EXAMPLE EMBODIMENTS

The various specific embodiments of the present invention, in particular, the exemplary embodiments described below, may be implemented with the aid of one or of multiple circuits. In one specific embodiment, a "circuit" may be understood to mean any type of logic-implemented entity, which may be hardware, software, firmware or a combination thereof. Thus, in one specific embodiment, a "circuit" may be a hardwired logic circuit or a programmable logic circuit such as, for example, a programmable processor, for example, a microprocessor. A "circuit" may also be software that is implemented or executed by a processor, for example, any type of computer program. In accordance with one alternative specific embodiment, any other type of implementation of the respective functions described in greater detail below may be understood to be a "circuit."

According to various specific embodiments, an industrial robot system is used, made up of an industrial robot including a gripping end effector, a camera and a box with objects to be gripped. One example is described below with reference to FIG. 1 and FIG. 2. In this example, the type and design of the robot kinematics is not established (it could, for example, be a serial or parallel kinematics including various types and numbers of joints).

Figure 1:
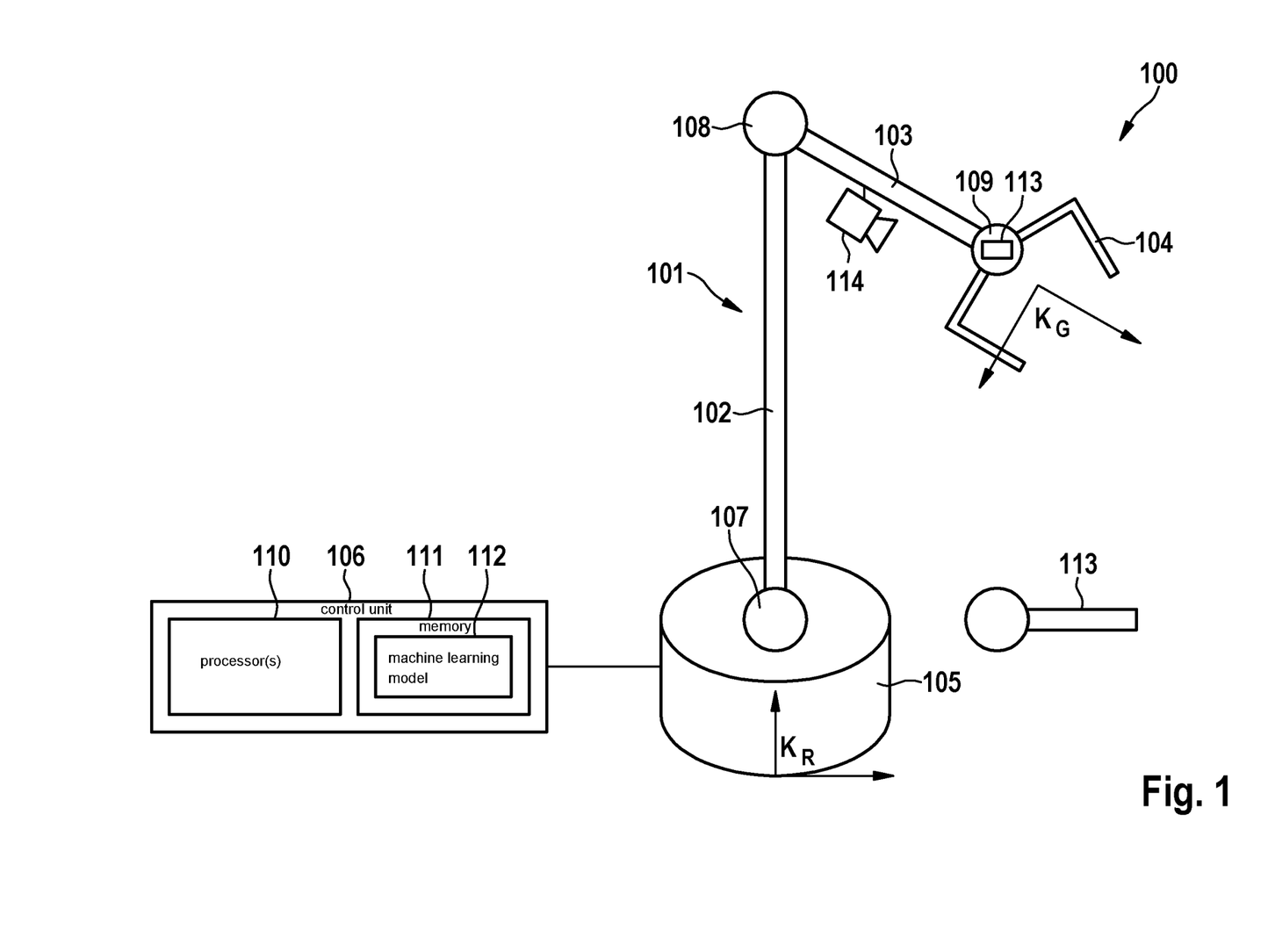
FIG. 1 shows a robot in accordance with an example embodiment of the present invention.

FIG. 1 shows a robot 100.

Robot 100 includes a robotic arm 101, for example, an industrial robotic arm for manipulation or mounting a workpiece (or one or multiple other objects). Robotic arm 101 includes arm elements 102, 103, 104 and a base (or holder) 105, with the aid of which arm elements 102, 103, 104 are supported. The term "arm element" refers to the moveable components of robotic arm 101, the actuation of which enables a physical interaction with the surroundings in order, for example, to carry out a task. For controlling, robot 100 includes a (robot) control unit 106, which is designed for implementing the interaction with the surroundings according to a control program. Last component 104 (which is furthest away from base 105 in the kinematic chain) of arm elements 102, 103, 104 is also referred to as end effector 104 and may include one or multiple tools such as, for example, a welding torch, a gripping instrument, a painting device or the like.

Other arm elements 102, 103 (situated closer to base 105) may form a positioning device so that, together with end effector 104, robotic arm 101 is provided with end effector 104 at its end. Robotic arm 101 is a mechanical arm, which is able to provide functions similar to a human arm (possibly with a tool at its end).

Robotic arm 101 may include joint elements 107, 108, 109, which connect arm elements 102, 103, 104 to one another and to base 105. A joint element 107, 108, 109 may include one or multiple joints, each of which is able to provide a rotatable movement (i.e., rotational movement) and/or a translational movement (i.e., displacement) for associated arm elements relative to one another. The movement of arm elements 102, 103, 104 may be initiated with the aid of actuators, which are controlled by control unit 106.

The term "actuator" may be understood to mean a component, which is designed to trigger a mechanism or process in response to its drive. The actuator is able to implement instructions created by control unit 106 (the so-called activation) into mechanical movements. The actuator, for example, an electromechanical converter, may be designed to convert electrical energy into mechanical energy in response to its drive.

The term "control unit" may be understood to mean an arbitrary type of logic-implemented entity, which may include, for example, a circuit and/or a processor, which is able to execute software, firmware or a combination thereof stored in a memory medium, and is able, for example, to issue the instructions/instructions, in the present example, to an actuator. The control unit may, for example, be configured by program code (for example, software) in order to control the operation of a system, in the present example, a robot.

In the present example, control unit 106 includes one or multiple processors 110 and one memory 111, which stores code and data, on the basis of which processor 110 controls robotic arm 101. According to various specific embodiments, control unit 106 controls robotic arm 101 on the basis of a machine learning model 112, which is stored in memory 111.

According to various specific embodiments, machine learning model 112 is designed and trained to specify (or predict) control parameters for robotic arm 101 for one or for multiple camera images that are fed to it.

Robot 100 and/or the robot cell, in which robot 100 is situated, may, for example, be fitted with one or with multiple cameras 114, which are configured to record images of the workspace of robot 100 and of an object 113 (or also of multiple objects) situated in the workspace.

The machine learning model is, for example, a neural convolution network, to which one or multiple images (for example, depth images) are fed. Prior to use in practice, the convolution network is trained with training data so that the control unit specifies suitable control parameters in each case for various poses (positions and orientations) of object 113.

The training data include, for example, a plurality of training data elements, each training data element including a camera image (or also multiple camera images) and associated (i.e., ground truth) control parameters. The control parameters include, for example, a position that end effector 104 is to assume for manipulating object 113. The neural network may then be trained with the aid of supervised learning.

According to various specific embodiments, various training data images are generated for various object poses and associated control parameters. If, for example, a particular random object pose for a training data image is assumed, the correct control parameters may be directly calculated therefrom (for example, because it is known from the object pose to which point end effector 104 is to be moved or at which point the object is to be gripped). Thus, the main task for generating a training data element may be considered to be generating a suitable camera image (for a respective camera in the case of multiple cameras) for a particular (random) object pose, so that if in practice, the object had the object pose, (respective) camera 114 would record this image.

According to various specific embodiments, an approach is provided for the purpose of calculating the transformation between camera pose and object pose for generating a camera image (for example for a training data set with virtual depth images as input for a neural convolution network for controlling the grip of the object by robotic arm 101).

According to various specific embodiments, calibration parameters (which in practice are typically available for a robot cell) are used in this case, and uncertainties (for example, of the camera pose) are physically plausibly taken into account. Thus, a method is provided for the simulation-based generation of a training data set, which is hardware-conscious, i.e., takes the properties of the present hardware (such as the camera) into account.

The object may have an arbitrary geometry. The camera images are depth images, for example. The camera is, for example, a pinhole camera and the camera images are corresponding images.

According to various specific embodiments, a robustness metric is also calculated in the training data generation process, which represents the probability of a successful gripping (capture) for the specific end effector (i.e., gripper type) of the robot. The position and orientation of the gripper for successful gripping is encoded in the camera image (or in multiple camera images) by the respective displacement, rotation and size of the image content (i.e., specifically of the object to be recorded) in the camera image. During training, the neural network (for example, deep convolution network) is trained, for example, to predict the values of the robustness metric for various gripping positions for the camera images. These values of the robustness metric may be considered to be an indication of robot control parameters, for example, that gripping position for which the neural network outputs the highest value of the robustness metric.

After training, i.e., during operation (practical application), the trained neural network is used for inference, i.e., to predict for various gripping options (for example, end effector poses), the robustness values from a real recorded camera image. The control unit may then, for example, select the gripping option having the maximum robustness value and may control the robot accordingly.

In generating (simulated) camera images for a camera for various object poses, the calibration results for the camera are used in the real robot system (i.e., robot cell). A camera calibration is typically carried out when constructing a robot system in a robot cell or prior to the processing process that is to be carried out by a robot, in order to enhance the accuracy of the knowledge of the camera pose and thus also of the robot actions (robot control) ascertained from the images generated by the camera.

According to various specific embodiments, extrinsic camera calibration values are used when generating training-camera-images, namely three-dimensional (for example, Cartesian) displacement values and rotation values of the camera with respect to the world coordinate system of the robot cell (i.e., a global reference coordinate system of the robot cell). These parameter values may be obtained, for example, by typical optimization-based calibration methods. According to various specific embodiments, uncertainty parameters of the camera calibration are also used, which may be ascertained during the calibration process. The uncertainty parameters represent the accuracy of the displacement values and rotation values that have been ascertained during the calibration. In addition, intrinsic camera parameters (camera matrix and noise values) of the real camera used in the robot cell may be utilized in order, in the simulation, to that the generation of the virtual camera images approximates as closely as possible the images of the real camera. Moreover, information about the pose and the size of the object area, in which object 113 may be located (for example, a box) is ascertained and used as input for generating the training-camera-images.

Figure 2:
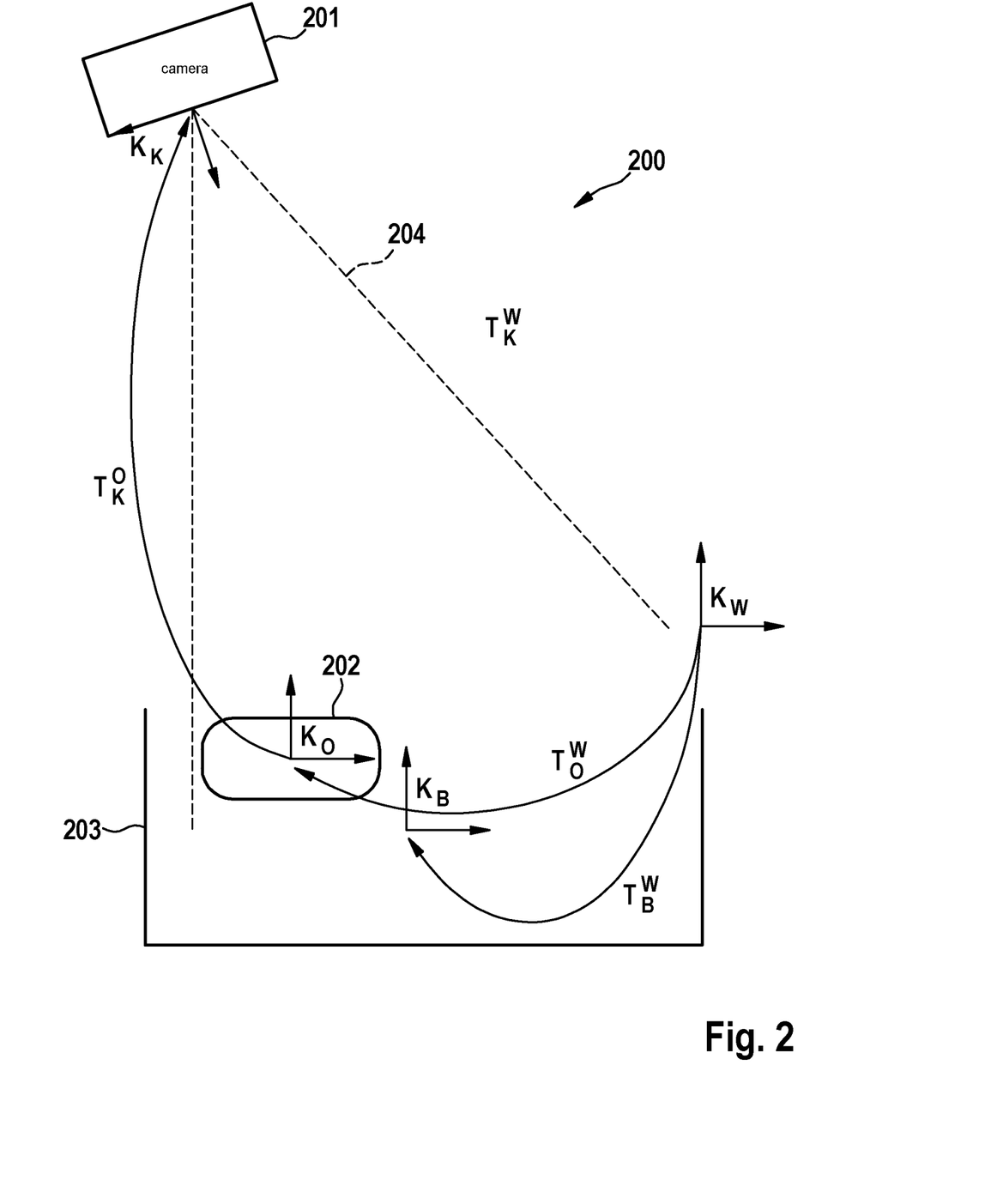
FIG. 2 shows components of a robot cell with respect to a simulation-based generation of training-camera-images, in accordance with an example embodiment of the present invention.

FIG. 2 shows components of a robot cell 200 with respect to a simulation-based generation of training-camera-images.

A camera 201 has a coordinate system $K_K$, an object 202 has a coordinate system $K_O$, an object area (for example, a box or a case) 203 has a coordinate system $K_B$, the robot has a coordinate system $K_R$ in its base, the end effector (gripper) moved by the robot has a coordinate system $K_G$ and robot cell 200 has a global coordinate system $K_W$, which represents a fixed reference system in robot cell 200. The coordinate systems of components 201, 202, 203 are each fixed for the respective component and thus define the pose of the respective component within the robot cell. To generate training-camera-images, the camera is modelled as a virtual pinhole camera with a perspective projection, which measures the surface of an object surface model.

Camera 201 has a viewing range 204.

Figure 3:
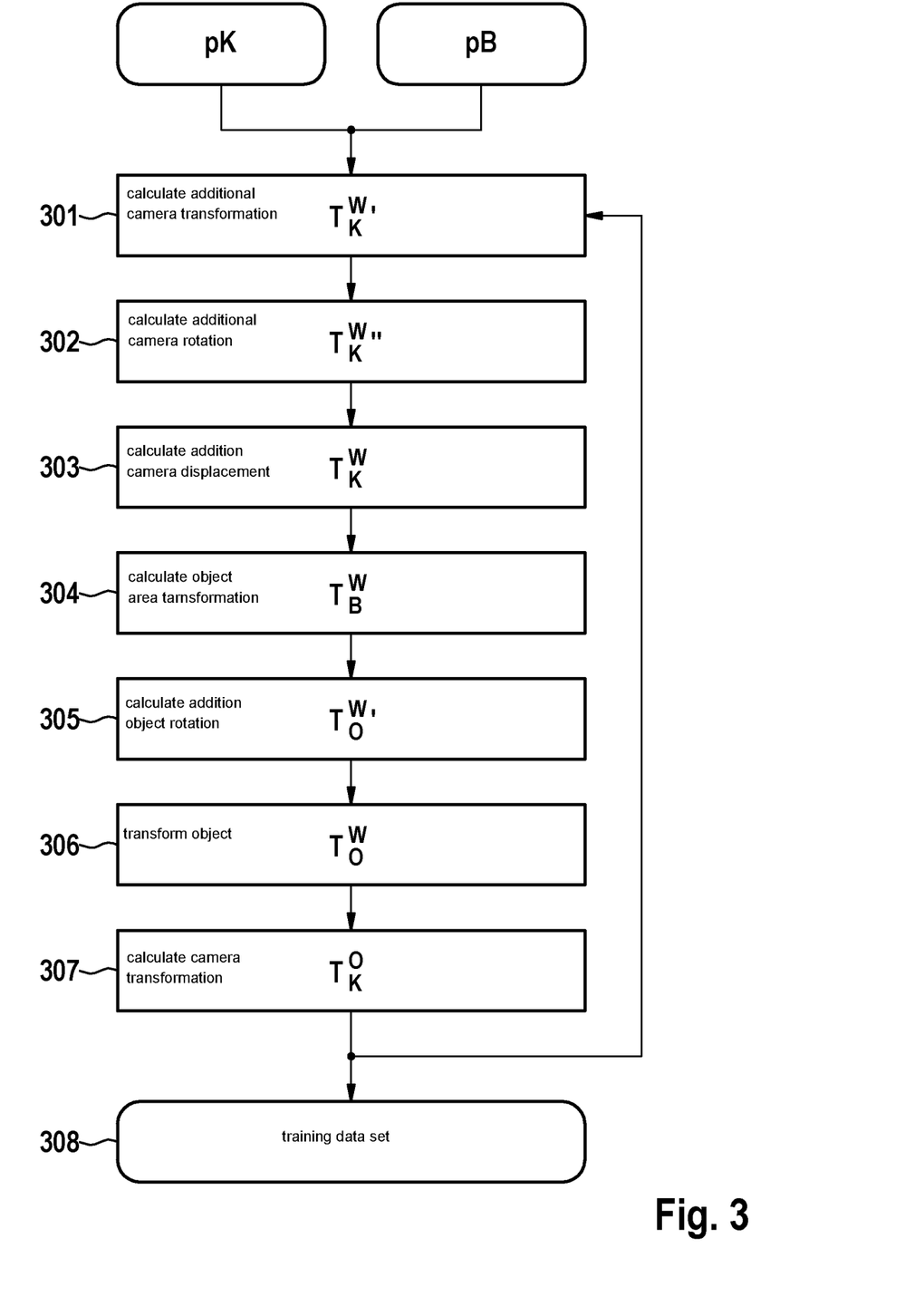
FIG. 3 shows a flowchart for a method for generating training-camera-images, in accordance with an example embodiment of the present invention.

FIG. 3 shows a flowchart 300 for a method for generating training-camera-images.

The method may be carried out by control unit 106 or by an external data processing device, which generates the training data. Control unit 106 or, in turn, an external data processing device is able to then train neural network 112 using the training data.

The input data for generating a camera image are external camera calibration parameter values $p_K=(x_K, y_K, z_K, A_K, B_K, C_K)$, which indicate the pose (position and orientation) of camera coordinate system $K_K$ in global coordinate system $K_W$, as well as associated uncertainties of the displacement values and of the rotation values, for example, $u_K=(t_K, r_K)$, for the sake of simplicity here the uncertainty in displacement $t_K$ and the uncertainty in rotation $r_K$ in this example being assumed to be equal for all coordinates or angles. These uncertainties are available typically as the result of the camera calibration process. Angles $A_K$, $B_K$, $C_K$ are, for example, the Euler angles, but other representation forms for the spatial orientation may also be used.

Additional input data are the intrinsic camera parameters in the form of a camera matrix K, which may be read out from the camera typically after an intrinsic camera calibration, as well as the noise value in camera viewing direction $\sigma_K$, which is typically specified by the camera manufacturer.

Further input data are the expected object area position $p_B=(x_B, y_B, z_B, A_B, B_B, C_B)$ which indicates the position of the center of the, in this example, cuboidal object area in the global coordinate system, and the size of object area $b_B=(h_B, w_B, d_B)$. These parameter values are typically provided by the configuration of the robot cell.

In 301, an additional camera transformation $T_K^W$ is calculated based on calibration parameter values $p_K$, i.e., a displacement and a rotation, which maps a default camera pose onto the camera pose provided by calibration parameter values $p_K$.

In 302, an additional camera rotation $Rot_K$ is calculated, which calculates the uncertainty in the rotation during the camera calibration. Rotation $Rot_K$ is calculated, for example, based on the convention of rotation axis and rotation angle, on the basis that each rotation may be represented in three-dimensional space by a suitable rotation axis and a rotation angle around the rotation axis. To calculate rotation $Rot_K$, the rotation axis is sampled from an equal distribution of the unity vectors in three-dimensional space. The rotation angle is sampled from a normal distribution with a mean value of zero and a standard deviation $r_K$ (i.e., the uncertainty in the orientation of the camera). A transformation $T_K^{W''}=T_K^W*Rot_K$ is then calculated.

In 303, an additional camera displacement $Trans_K$ is calculated, which takes the uncertainty in the displacement of the camera calibration into account. For this purpose, a displacement direction is sampled from an equal distribution of the unity vectors in three-dimensional space. The length of the displacement is sampled from a normal distribution with a mean value of zero and a standard deviation $t_K$ (i.e., the uncertainty in the position of the camera). The final camera transformation $T_K^W=T_K^{W''}*Trans_K$ is then calculated.

In 304, an object area transformation $T_B^W$ is calculated based on the object area pose $p_B$, i.e., a displacement and a rotation, which maps a default object-area pose onto the object area pose provided by parameter values $p_B$. In this case, as in the case of the camera pose, additional uncertainties of the object area pose may be taken into account.

In 305, an additional object rotation $Rot_O$ is calculated. For this purpose, a rotation is sampled from an equal distribution of rotations in order to take a random rotation of object 202 in object area 203 into account. This is relevant, for example, in the case that objects are situated in piles, in which each object may have a random rotation in three-dimensional space. If the object may be expected to consistently lie on an even surface (and not in piles), a fixed orientation may also be used. An object displacement $Trans_O$ is also calculated by sampling from an equal distribution over object area U $([-h_B/2, +h_B/2]\times[-w_B/2, +w_B/2]\times[d_B/2, +d_B/2])$, to account for the fact that object 202 may have a random position within object area 203. In the case of piles of objects, the object rotation and object displacement of the individual objects in the pile in relation to the object area, may alternatively also be determined by a physics simulation. Thus, object rotation and object displacement result in transformation $T_O^B$.

In 306, object 202 is transformed with the pose of object area 203. In this case, the object transformation is calculated with reference to the world coordinate system with the aid of $T_O^W=T_B^W*T_O^B$.

In 307, the camera transformation is calculated with respect to the object coordinate system as $T_K^O=(T_O^W)^{-1}*T_K^W$. This transformation is then used to position the virtual camera in the simulation space. The object (i.e., the surface model of the object) is positioned in the origin of the simulation space. The camera image is generated by a virtual measurement by rendering (in particular, using the positioned virtual camera) the simulation scene thus generated (for example, for generating a depth image). For this purpose, camera matrix K is used and noise parameter $\sigma_K$ is applied to the measured data including a normally distributed noise.

The generation of a camera image in this way is carried out multiple times in order to generate a plurality of camera images for a training data set 308.

Since the camera pose and the object pose used physically represent parameter values from the real robot cell with associated uncertainties, this results in a training data set that corresponds to the real physical configuration of the robot cell.

In summary, a method is provided according to various specific embodiments, as it is described below with reference to FIG. 4.

Figure 4:
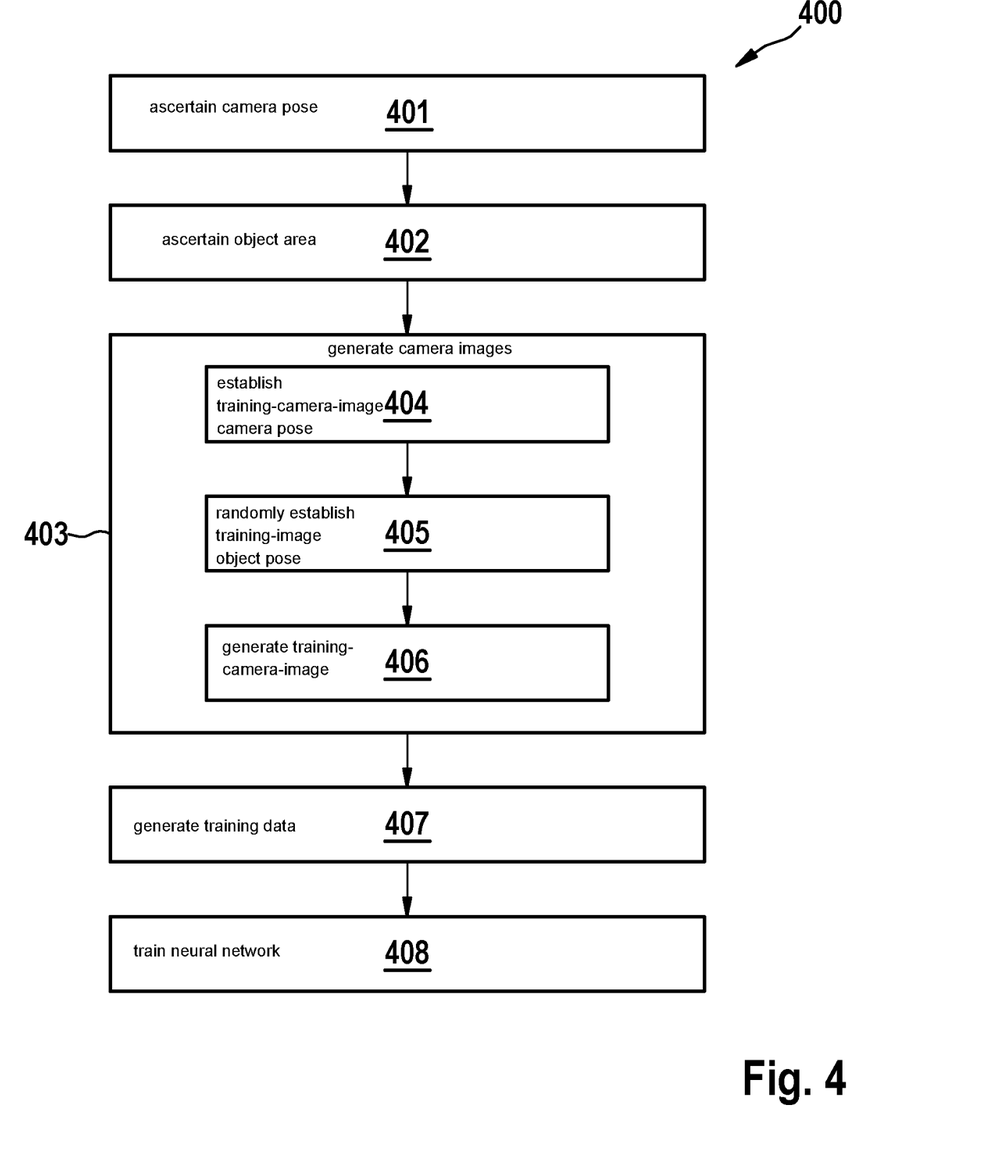
FIG. 4 shows a flowchart for a method for training a neural network for controlling a robot, in accordance with an example embodiment of the present invention.

FIG. 4 shows a flowchart 400 for a method for training a neural network for controlling a robot.

In 401, a camera pose in a robot cell and of an uncertainty area around the ascertained camera pose are ascertained.

In 402, an object area in the robot cell is ascertained, which includes positions for an object to be handled by the robot.

Training-camera-images are generated in 403.

In the process, a training-camera-image camera pose is randomly established for each training-camera-image in 404 in the uncertainty area around the ascertained camera pose, in 405 a training-camera-image object pose is randomly established in the object area and in 406, the training-camera-image is generated so that it shows the object with the training-camera-image object pose from the perspective of a camera with the training-camera-image camera pose.

In 407, training data are generated from the training-camera-images, each training-camera-image being assigned one or multiple training-robot control parameters for handling the object in the training-camera-image object pose of the training-camera-image.

In 408, the neural network is trained using the training data, the neural network being trained for the purpose of outputting, from a camera image that shows the object, a specification of one or of multiple robot control parameters for manipulating the object.

The method generates synthetic sensor data. These may be sensor data corresponding to various visual sensors such as stereo cameras, time-of-flight cameras and laser scanners.

Specific embodiments may be used for the purpose of training a machine learning system and of autonomously controlling a robot, in order to accomplish various manipulation tasks under various scenarios. Specific embodiments are applicable, in particular, for controlling and supervising the execution of manipulation tasks, for example, in assembly lines. They may, for example, be seamlessly integrated into a traditional GUI for a control process.

"Robot" may be understood to mean any physical system (including a mechanical part whose movement is controlled), such as a computer-controlled machine, a vehicle, a household appliance, a power tool, a manufacturing machine, a personal assistant or an access control system.

The neural network may be a convolution network for the regression or classification of data.

Various specific embodiments may receive and use sensor signals from various visual sensors in order, for example, to obtain sensor data about demonstrations or systems states (robot and object) as well as configurations and scenarios. The sensor data may be processed. This may include a classification of the sensor data or the implementation of a semantic segmentation of the sensor data, for example, in order to recognize the presence of objects (in the surroundings in which the sensor data have been obtained). Specific embodiments may be used for the purpose of training a machine learning system and for autonomously controlling a robot, in order to accomplish various manipulation tasks under various scenarios. Specific embodiments are applicable, in particular, for controlling and supervising the execution of manipulation tasks, for example, in assembly lines. They may, for example, be seamlessly integrated into a traditional GUI for a control process.

The method is computer-implemented according to one specific embodiment.

Although the present invention has been shown and described primarily with reference to particular specific example embodiments, it should be understood by those familiar with the technical field that numerous changes thereto with respect to design and details may be undertaken without departing from the essence and scope of the present invention, in view of the disclosure herein.

What is claimed is:

1. A method for training a neural network for controlling a robot, comprising:
   ascertaining a camera pose in a robot cell and an uncertainty area around the ascertained camera pose;
   ascertaining an object area in the robot cell, which includes positions for an object to be handled by the robot;
   generating training-camera-images, including, for each training-camera-image of the training-camera-images:
      establishing a training-camera-image camera pose randomly in the uncertainty area around the ascertained camera pose;
      establishing a training-camera-image object pose randomly in the object area;
      generating the training-camera-image, so that it shows the object with the training-camera-image object pose from the perspective of a camera with the training-camera-image camera pose;
   generating training data from the training-camera-images, each of the training-camera-images being assigned one or multiple training-robot control parameters for handling the object in the respective training-camera-image object pose of the training-camera-image; and
   training the neural network using the training data, the neural network being trained to output, from a camera image that shows the object, a specification of one or of multiple robot control parameters for handling the object.

2. The method as recited in claim 1, wherein the uncertainty area of the ascertained camera pose includes an uncertainty area for the ascertained camera position and/or an uncertainty area for the ascertained camera orientation.

3. The method as recited in claim 2, wherein the training-camera-image camera pose is randomly selected according to a normal distribution corresponding to the uncertainty area for the ascertained camera position and/or according to a normal distribution corresponding to the uncertainty area for the ascertained camera orientation.

4. The method as recited in claim 1, further comprising:
   ascertaining an uncertainty area around the ascertained object area pose, wherein the establishing of the training-camera-image object pose includes a random selection of a camera-image object area pose in the object-area uncertainty area and randomly establishing the training-camera-image object pose in the object area at the selected camera-image object area pose.

5. The method as recited in claim 4, wherein the training-camera-image object area pose is randomly selected according to a normal distribution corresponding to the uncertainty area for the ascertained object area pose.

6. The method as recited in claim 1, wherein the training-camera-image object pose is established by establishing a training-camera-image object position according to an equal distribution of object positions in the object area.

7. The method as recited in claim 1, wherein the training-camera-image object pose is established by establishing a training-camera-image object pose according to a transformation into the object area.

8. A method for controlling a robot, comprising:
   training a neural network by:
      ascertaining a camera pose in a robot cell and an uncertainty area around the ascertained camera pose;
      ascertaining an object area in the robot cell, which includes positions for an object to be handled by the robot;
      generating training-camera-images, including, for each training-camera-image of the training-camera-images:
         establishing a training-camera-image camera pose randomly in the uncertainty area around the ascertained camera pose;
         establishing a training-camera-image object pose randomly in the object area;
         generating the training-camera-image, so that it shows the object with the training-camera-image object pose from the perspective of a camera with the training-camera-image camera pose;
      generating training data from the training-camera-images, each of the training-camera-images being assigned one or multiple training-robot control parameters for handling the object in the respective training-camera-image object pose of the training-camera-image; and
      training the neural network using the training data, the neural network being trained to output, from a camera image that shows the object, a specification of one or of multiple robot control parameters for handling the object;
   receiving a first camera image that shows a first object to be handled by the robot;
   feeding the first camera image to the trained neural network; and
   controlling the robot according to the robot control parameters specified by the output of the trained neural network.

9. A device configured to train a neural network for controlling a robot, the device configured to:

ascertain a camera pose in a robot cell and an uncertainty area around the ascertained camera pose;

ascertain an object area in the robot cell, which includes positions for an object to be handled by the robot;

generate training-camera-images, for each training-camera-image of the training-camera-images including:

establishing a training-camera-image camera pose randomly in the uncertainty area around the ascertained camera pose;

establishing a training-camera-image object pose randomly in the object area;

generating the training-camera-image, so that it shows the object with the training-camera-image object pose from the perspective of a camera with the training-camera-image camera pose;

generate training data from the training-camera-images, each of the training-camera-images being assigned one or multiple training-robot control parameters for handling the object in the respective training-camera-image object pose of the training-camera-image; and train the neural network using the training data, the neural network being trained to output, from a camera image that shows the object, a specification of one or of multiple robot control parameters for handling the object.

10. A non-transitory computer-readable memory medium on which are stored program instructions for training a neural network for controlling a robot, the instructions, when executed by one or more processors, causing the one or more processors to perform the follow:

ascertaining a camera pose in a robot cell and an uncertainty area around the ascertained camera pose;

ascertaining an object area in the robot cell, which includes positions for an object to be handled by the robot;

generating training-camera-images, including, for each training-camera-image of the training-camera-images:

establishing a training-camera-image camera pose randomly in the uncertainty area around the ascertained camera pose;

establishing a training-camera-image object pose randomly in the object area;

generating the training-camera-image, so that it shows the object with the training-camera-image object pose from the perspective of a camera with the training-camera-image camera pose;

generating training data from the training-camera-images, each of the training-camera-images being assigned one or multiple training-robot control parameters for handling the object in the respective training-camera-image object pose of the training-camera-image; and training the neural network using the training data, the neural network being trained to output, from a camera image that shows the object, a specification of one or of multiple robot control parameters for handling the object.

* * * * *